United States Patent
Sandlund et al.

(10) Patent No.: US 9,019,851 B2
(45) Date of Patent: Apr. 28, 2015

(54) NETWORK NODE AND METHOD RELATED TO BUFFER ESTIMATION

(75) Inventors: Kristofer Sandlund, Luleå (SE); Jonas Pettersson, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 344 days.

(21) Appl. No.: 13/519,399

(22) PCT Filed: Jun. 21, 2011

(86) PCT No.: PCT/EP2011/060298
§ 371 (c)(1),
(2), (4) Date: Jun. 27, 2012

(87) PCT Pub. No.: WO2012/175113
PCT Pub. Date: Dec. 27, 2012

(65) Prior Publication Data
US 2012/0327799 A1    Dec. 27, 2012

(51) Int. Cl.
*H04W 72/12* (2009.01)

(52) U.S. Cl.
CPC ...... *H04W 72/1221* (2013.01); *H04W 72/1284* (2013.01)

(58) Field of Classification Search
CPC ............ H04W 28/12; H04W 28/0278; H04W 72/0413; H04W 72/1284; H04W 74/004; H04L 47/30; H04L 47/58
USPC .................................. 370/328–338, 465, 468
See application file for complete search history.

(56) References Cited

U.S. PATENT DOCUMENTS

2009/0034455 A1* 2/2009 Lee et al. ...................... 370/329
2010/0135166 A1   6/2010 Ahluwalia

FOREIGN PATENT DOCUMENTS

EP        1509011 A2    2/2005
WO     2010090565 A1    8/2010

OTHER PUBLICATIONS

3rd Generation Partnership Project. "Uplink control signalling structure (Revision of R1-041086)." 3GPP TSG-RAN WG1 Meeting #38bis, R1-041222, Sep. 20-24, 2004, Seoul, Korea.
3rd Generation Partnership Project. "Issues Regarding UL Persistent Scheduling." 3GPP TSG RAN WG2 Meeting #60bis, R2-080458, Jan. 14-18, 2008, Sevilla, Spain.
3rd Generation Partnership Project. "On the suitability of source controlled variable-rate coding for VoIP over LTE." 3GPP TSG-SA4#60, S4-100635, Aug. 16-20, 2010, Erlangen, Germany.
(Continued)

*Primary Examiner* — Pao Sinkantarakorn
(74) *Attorney, Agent, or Firm* — Murphy, Bilak & Homiller, PLLC

(57) ABSTRACT

The present invention relates to a network node such as a base station for a wireless communications system, and to a method for supporting a change of a buffer estimation state of a user equipment from a passive to a proactive state. The method comprises receiving (410) information describing a buffer status of the user equipment, and determining (420) whether to change the buffer estimation state of the user equipment to the proactive state based on the received information. The purpose is to achieve a more correct UE buffer estimation state and thus better accuracy for the buffer estimation.

20 Claims, 6 Drawing Sheets

(56) References Cited

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V.8.6.0, Sep. 2008, 1-137.

3GPP, "3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321 V8.3.0, Sep. 2008, 1-36.

3GPP, "3rd Generation Partnership Project; Technical Specification Group Radio Access Network; Evolved Universal Terrestrial Radio Access (E-UTRA) Radio Link Control (RLC) protocol specification (Release 8)", 3GPP TS 36.322 V8.3.0, Sep. 2008, 1-38.

3GPP, "3rd Generation Partnership Project; Technical Specification Group Radio Access Network; Evolved Universal Terrestrial Radio Access (E-UTRA); Packet Data Convergence Protocol (PDCP) specification (Release 8)", 3GPP TS 36.323 V8.3.0, Sep. 2008, 1-24.

* cited by examiner

NETWORK NODE AND METHOD RELATED TO BUFFER ESTIMATION

TECHNICAL FIELD

The disclosure generally relates to buffer estimation. In particular it relates to a network node and a method in a network node of a wireless communications system for supporting a change of a buffer estimation state of a user equipment from a passive to a proactive state.

BACKGROUND

The Universal Mobile Telecommunication System (UMTS) is one of the third generation mobile communication technologies designed to succeed Global System for Mobile communications (GSM). Long Term Evolution (LTE) is a project within the 3$^{rd}$ Generation Partnership Project (3GPP) to improve the UMTS standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a wireless device such as a User Equipment (UE) 150 is wirelessly connected to a base station (BS) 110a commonly referred to as an evolved NodeB (eNodeB), as illustrated in FIG. 1. Each eNodeB 110a-c serves a cell 120a-c.

In LTE, scheduling is modelled in the Medium Access Control (MAC) layer and resides in the eNodeB. A scheduler in the eNodeB assigns radio resources, also called Resource Blocks (RB), for a downlink as well as for an uplink using the Physical Downlink Control CHannel (PDCCH). Assignments are used to assign resources for the downlink, and grants are used to assign resources for the uplink. The uplink is the transmission path from the UE to the eNodeB. The downlink is the inverse of the uplink, i.e. the transmission path from the eNodeB to the UE.

As it is the eNodeB that handles the scheduling for the uplink, the eNodeB needs information about the current state of the buffers in the UE, i.e. if and how much data the UE has in its priority queues, in order to allocate resources and to prioritize resource allocations between different UEs. Information about the buffer states is transmitted by the UE in a one bit Scheduling Request (SR) and/or in a Buffer Status Report (BSR). The SRs are transmitted on a control channel such as a Physical Uplink Control CHannel (PUCCH) or Radio Access CHannel (RACH), while the BSRs are transmitted on a data channel such as a Physical Uplink Shared CHannel (PUSCH). The BSRs are often transmitted together with user data, and MAC signaling is used for the transmission.

When the eNodeB receives an SR it knows that there is data waiting for transmission in the UE buffer. However, uplink BSRs are needed in order for the eNodeB to know the amount of data waiting for transmission. In E-UTRAN uplink BSRs refer to the data that is buffered for a Logical Channel Group (LCG) in the UE. Four LCGs and two formats are used for the reporting. A short BSR format is used to inform about the buffer size of one LCG, and a long BSR format is used to inform about the buffer sizes of all four LCGs.

The UE triggers a regular BSR and SR when uplink data becomes available for transmission and the buffers were empty just before this new data became available for transmission. A BSR and SR are also triggered when uplink data becomes available for transmission and the data belongs to an LCG with higher priority than the LCGs for which data already existed in the UE buffer.

In case a transport block size is larger than the amount of data available for transmission at the time of assembly of the MAC Protocol Data Unit (PDU) for transmission, a BSR may also be included with the data. Such a BSR is referred to as a padding BSR. In case the UE has data for more than one LCG but is using the short BSR format that may only contain information about one LCG, a truncated format is also available as a padding BSR. Still another type of BSR exists, called the periodic BSR, to handle reporting for continuous flows where the buffer is not frequently emptied. A timer-based trigger for each UE determines when a periodic BSR shall be transmitted. However, it is only transmitted if no regular BSR has been transmitted.

Precise and up-to-date scheduling information allows for more accurate scheduling decisions, and may help to optimize the use and management of radio resources and to improve capacity. However, the accuracy of the information provided by the UE is limited by the rather low granularity of the BSRs, and frequency of the SR and BSR transmissions, and by the delay between the reception of the SR or BSR and the scheduling decision.

For delay sensitive services with periodical packet arrival, such as Voice over Internet Protocol (VoIP) services, the likelihood that the buffer status information in the BSR is outdated when it is used is high. It is likely that additional data has arrived since the BSR was transmitted. It is also likely that the buffer will be emptied frequently, and in such a case the only available information about the buffer status is the one bit SR.

With incorrect information about the buffer status in the UE, the scheduler in the eNodeB will assign either too many or too few RBs in the grant. Too many assigned RBs results in that the UE transmits padding instead of useful data, which may lead to a reduced system capacity. Too few assigned RBs may lead to Radio Link Control (RLC) segmentation and an increased transmission delay.

FIG. 2 illustrates a simplified example of what might happen when a scheduling principle adopted for best-effort data services is applied to VoIP, resulting in unnecessary delay and many grant transmissions between an eNodeB 210 and a UE 250. When a first data unit, here called packet 230, arrives at the UE buffer, an SR 220 is transmitted that triggers a small grant 221 only allowing transmission in 222 of a BSR and a small amount of data (TX) from the first packet 230. The packets arriving at the UE have a size of 320 bits in this example. While waiting for a second grant 223, a second packet 231 arrives. However, the second grant received in 223 does not allow for the transmission of the second packet 231, so a new BSR is transmitted together with the first packet data in 224. Two grants 221, 223 are thus spent to transmit one single first packet 230, and a second packet 231 that could have been transmitted with the first packet 223 has to wait for the transmission of a third grant in 225.

To avoid these problems, a method for buffer status estimation is used, as schematically illustrated in the signaling diagram in FIG. 3. The eNodeB 310 may estimate when a first packet has arrived to the buffer of the UE 350. The estimate may be based on knowledge about the service behavior indicating arrival times and packet sizes. Such knowledge may comprise e.g. that most VoIP codecs have a fixed frame interval of 20 ms when in a talk state. A new packet will thus arrive every 20 ms. In silent state the frame interval may increase to e.g. 160 ms for an Adaptive Multi Rate (AMR) codec. Further it may be assumed that a packet size is the same as a size of a previous packet. Furthermore, codec state changes, such as a change from talk state to silence state may be detected by examining the sizes of received packets.

The buffer estimation method makes it possible to schedule data more efficiently, with shorter delays. In the signaling diagram in FIG. 3, a packet 330 with a size of 320 bits is buffered in the UE 350. A SR 320 may be sent from the UE 350 to the eNodeB 310. The eNodeB 310 estimates that a further 320-bit packet 331 may arrive to the UE 350 before a grant sent from the eNodeB 310 has propagated to the UE 350. Thus a 640-bit grant 321 may be sent from the eNodeB 310 to the UE 350. Having received the grant 321, the UE 350 may send the two packets 330, 331 comprising 640 bits to the eNodeB 310.

The UE buffer estimation performed by the eNodeB may thus preemptively increase the buffer estimates for UEs without having to receive neither an SR nor a BSR. Proactive grants may then be sent from the eNodeB to the UE, thereby reducing the overall traffic load within the system. The UE buffer estimation also allows for more accurate estimation of the buffer status in a highly loaded system where the interval between UE schedulings might be higher than 20 ms, in which case multiple frames may be comprised in a single grant.

The buffer estimation method may distinguish and alter between two states: a proactive state corresponding to the codec's talk state, and a passive state corresponding to the codec's silent state. A state change from proactive to passive may occur when the codec switches between the corresponding talk state and silence state. A silence state frame is for common speech codecs sometimes referred to as a Silence Indicator (SID) frame. A SID frame is transmitted by the codec when no one is speaking and no speech data needs to be transmitted. When someone is speaking, the codec is in the talk state and transmits talk frames.

In the proactive state of the buffer estimation, the eNodeB estimates when the next talk frame will arrive and which size it will have. When an SR is received and the current buffer estimate is zero, the buffer content size may be set to the expected size of one talk frame and the estimated arrival time at the UE buffer may be set to the SR transmission time. A talk frame interval after the latest estimated arrival time, the buffer size estimate is increased by the size of the latest received frame. Furthermore the latest estimated arrival time is set to the current time. If the talk frame interval is 20 ms, the buffer content size estimation will thus be increased every 20 ms. On BSR reception, the buffer size estimates is updated according to the report. On reception of a data unit, the state will change to passive if the size of the data unit is smaller than a size threshold. The size threshold may be between the size of a SID frame and the size of a talk frame. Furthermore, the passive state may be entered if two consecutive data units are received with only padding.

In the passive state the eNodeB expects SRs when data has arrived in the buffer of a UE. On SR reception, the buffer content size may be set to the expected size of one SID frame and the estimated arrival time may be set to the SR transmission time, if the current buffer estimate is zero. On reception of a data unit, the state is changed to proactive if the size of the data unit is larger than the size threshold.

However, when variable rate codecs such as Enhanced Variable Rate Codec (EVRC) are used, the detection of when to change from passive and to proactive is made more difficult. This is due to that there may be little difference between the size of a SID frame and the size of a talk frame with a variable rate codec. When speech is easy to code, the frames in talk state may be shorter for an EVCR than an AMR codec, which thus makes it difficult to separate talk frames from SID frames based on the frame size in such a case. When it is difficult to tell if a frame is a SID frame or a talk frame, it is also difficult to determine when to change from passive to proactive state. Using a size threshold as described above may not give a correct result. This may in turn make the buffer estimation less accurate, thus affecting the performance of a UE.

SUMMARY

It is therefore an object to address some of the problems outlined above, and to allow for a more correct UE buffer estimation state and thus better accuracy in the buffer estimation. This object and others are achieved by the method and the network node according to the independent claims, and by the embodiments according to the dependent claims.

In accordance with one embodiment, a method in a network node of a wireless communications system for supporting a change of a buffer estimation state of a user equipment from a passive to a proactive state is provided. The method comprises receiving information describing a buffer status of the user equipment, and determining whether to change the buffer estimation state of the user equipment to the proactive state based on the received information.

In accordance with another embodiment, a network node for a wireless communications system is provided. The network node is configured to support a change of a buffer estimation state of a user equipment from a passive to a proactive state. The network node comprises a receiver configured to receive information describing a buffer status of the user equipment, and a processing unit configured to determine whether to change the buffer estimation state of the user equipment to the proactive state based on the received information.

An advantage of embodiments is that the buffer estimation may be more accurate when in a correct state. The improved accuracy increases the capacity and/or reduces the delay for individual UEs, e.g. when variable rate codecs are used. Other objects, advantages and features of embodiments will be explained in the following detailed description when considered in conjunction with the accompanying drawings and claims.

DETAILED DESCRIPTION

Figure 1:
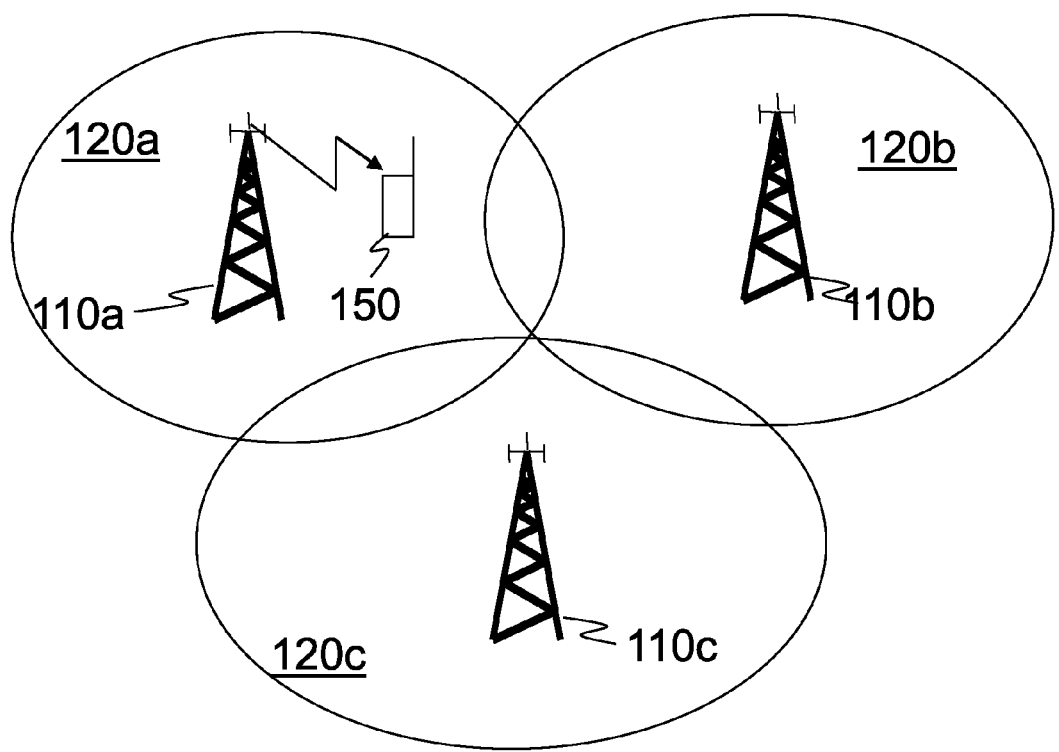
FIG. 1 is a schematic illustration of a conventional wireless communications system.
Figure 2:
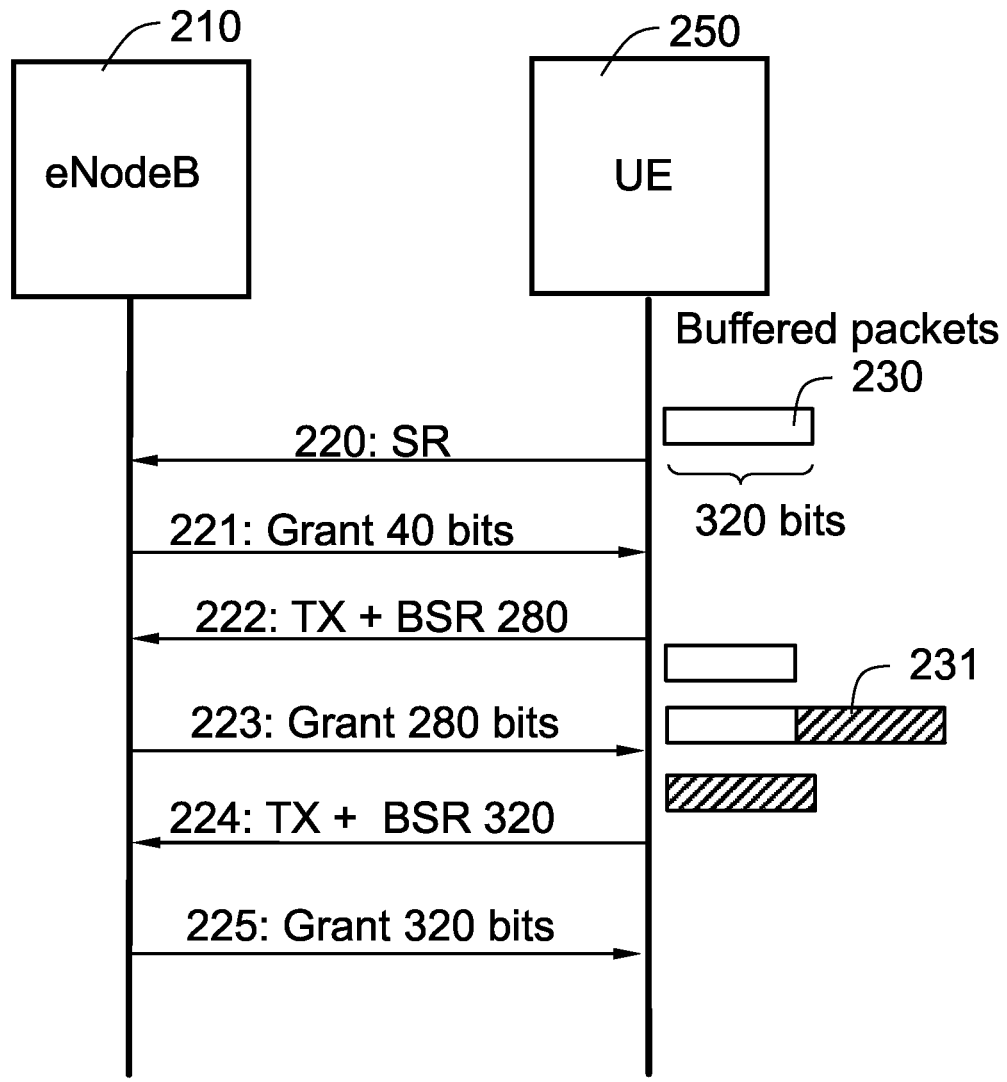
FIG. 2 is a signaling diagram schematically illustrating SR and BSR transmission without buffer estimation.
Figure 3:
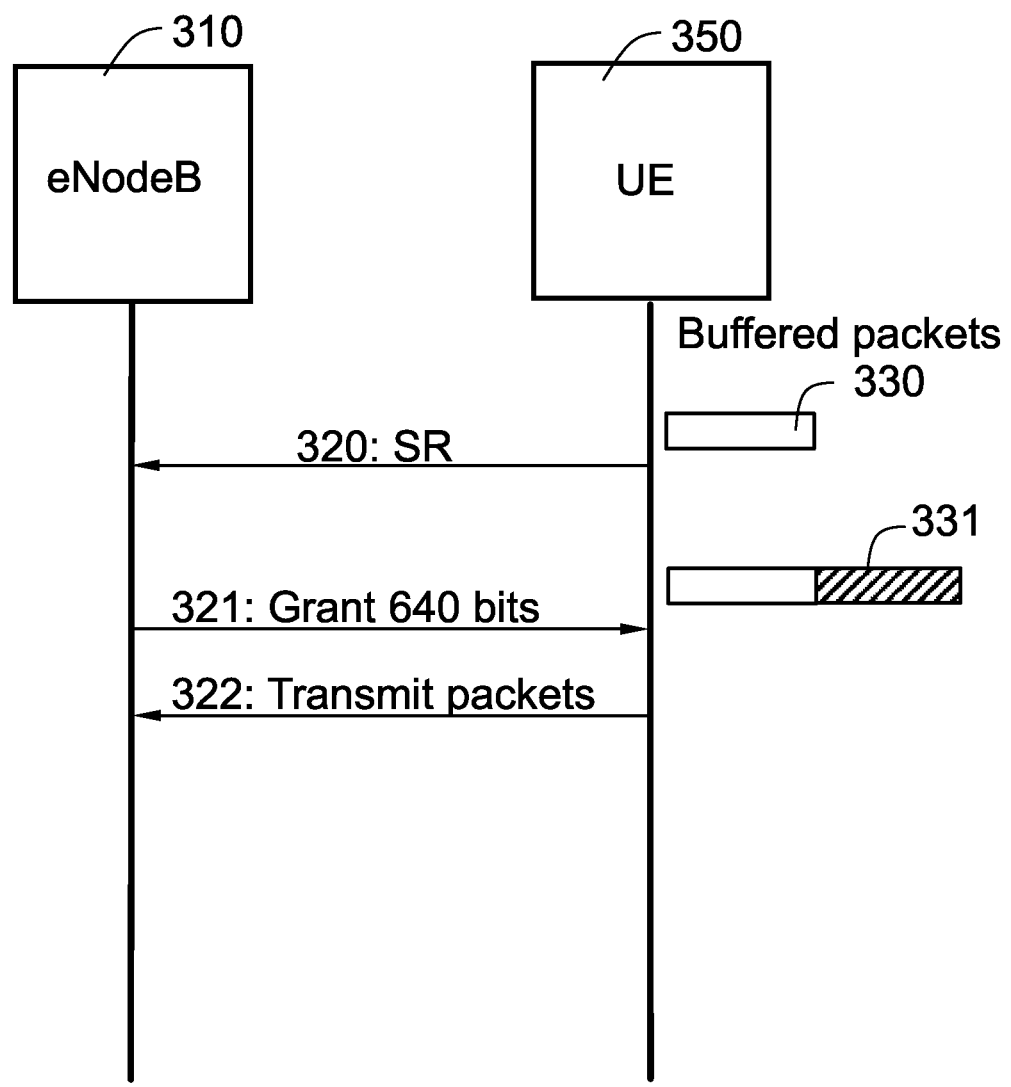
FIG. 3 is a signaling diagram schematically illustrating SR and BSR transmission with buffer estimation.

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the embodiments are primarily described in the form of a method and device, they may also be embodied in a computer program product as well as in a system comprising a computer processor and a memory coupled to the processor, wherein the memory is encoded with one or more programs that may perform the functions disclosed herein.

Embodiments are described in a non-limiting general context in relation to an LTE network where the scheduling of the uplink and the buffer estimation is performed in the eNodeB. However, it should be noted that the embodiments may also be applied to other types of radio access networks where the uplink scheduling and the buffer estimation is controlled by a network node, which may be the base station.

The problem of how to allow for an accurate buffer estimation state transition from passive to proactive for a UE, is addressed by a solution where the network node receives information describing a buffer status of the UE, and determines whether to change the buffer estimation state of the UE to the proactive state based on the received information. The purpose is thus to improve the switch conditions from the passive to the proactive state.

In a first embodiment, the UE is in the passive buffer estimation state, and the network node, which may be an eNodeB, receives a data unit together with a BSR. The BSR indicates the amount of remaining data in the queue where e.g. the voice service is allocated. According to the first embodiment, it is possible to estimate that a talk spurt is received if the BSR indicates that the data remaining in the UE buffer is significantly larger than what was expected from a SID frame. The size threshold may be set to be in between the expected size of a SID frame and a talk frame, and the state is changed to proactive if the size indicated in the BSR is above the threshold. However, to avoid switching state when the SID frame and/or talk frame is segmented, the buffer estimation method may in embodiments include tracking of how many octets of segments that have been received in the current frame and possibly previous frames, and add this number to the buffer content size indicated in the BSR. Therefore, it may be determined that the buffer estimation state should be changed from passive to proactive state, only when the sum of the size indicated in the BSR (BSRcontentSize in the pseudo code below) and the size of currently received segments (sizeOfReceivedSegments in pseudo code below) is larger than the size threshold (firstThreshold in pseudo code below). This may be described in pseudo code in the following way:

If (isInPassiveState && (sizeOfReceivedSegments+BSRcontentSize>firstThreshold)
   Move to proactive state;

The value of the size threshold used may be pre-determined, or it may be determined based on observed traffic patterns. Furthermore the value may be dependent on the type of codec used. As an example, the value of the size threshold may be determined to be between the size of a one eighth rate frame and a one fourth rate frame, when an EVRC codec is used. Alternatively, the size threshold may be between a one fourth rate frame and a one half rate frame for the EVRC codec. For AMR, the size threshold may be determined to be between the size of the SID frame and the size of the smallest talk frame which is 4.75 kbps. If it is not known what codec type that is used, it may be possible to observe how the frames arrive and guess what frames that should be handled in passive state and what frames that should be handled in active state.

The size of currently received segments, called sizeOfReceivedSegment in the pseudo code above, is calculated so that every time the eNodeB receives a segment of a data unit, a counter is incremented by the number of data bits in this segment. If the last segment of a data unit is received, this counter is set to 0.

The advantage of this first embodiment is thus that it allows for more accurate state changes from passive to proactive, especially when variable rate codecs are used and/or when data units are segmented over two or more frames.

In a second embodiment, the UE is in the passive buffer estimation state, and the network node, which may be an eNodeB, receives an SR. The advantage of the second embodiment is that it allows for an earlier transition from passive to proactive state compared to the conventional buffer estimation method by observing the arrival of SRs, which indicate a buffer status in the UE. When in passive state and using e.g. an AMR codec, the eNodeB does not expect a next SID frame to arrive until at least 60 ms after a previous SID frame. For AMR, the time interval between the first and second SID frame is 60 ms, and between the second and third SID frame and all the following SID frames is 160 ms. Some codecs have even larger intervals between the SID frames. If it is assumed that the UE buffer is empty, i.e. the buffer estimate (bufferEstimate in pseudo code below) is zero, and the eNodeB receives a SR shortly after the estimated arrival of the latest data unit in the UE, it may be assumed that the codec has left the silence state, also referred to as the DTX state. The buffer estimation state of the UE may therefore be changed to proactive. The SR indicates the arrival of a current data unit in the UE, and the time of arrival of the current data unit may be estimated to be the send time of the SR (estimatedSendTimeOfCurrentSR in pseudo code below). Actually, it is the time of arrival of the current data unit in the UE that should be compared with an estimated time of arrival in the UE of a previous data unit (previousEstimatedPacketArrival in pseudo code below). If the difference between the two time of arrival estimates is below a time threshold (secondThreshold in pseudo code below), the state should be changed to proactive. In pseudo code, this may be described as:

If (isInPassiveState && SRreceived && bufferEstimate == 0) {
   If (estimatedSendTimeOfCurrentSR - previousEstimatedPacketArrival < secondThreshold) {
     Move to proactive state;
   }
}

In one example embodiment, the time threshold used to determine whether to move to the proactive state is 30 ms. This would e.g. be a suitable threshold for the AMR case, as the time difference of the two first SID frames is 60 ms.

As an EVRC may not use discontinuous transmission (DTX), the buffer estimation should never be in passive state. An advantage of the second embodiment is thus that the state is rapidly switched back to proactive state if it has erroneously switched to passive state for an EVRC.

Figure 4A:
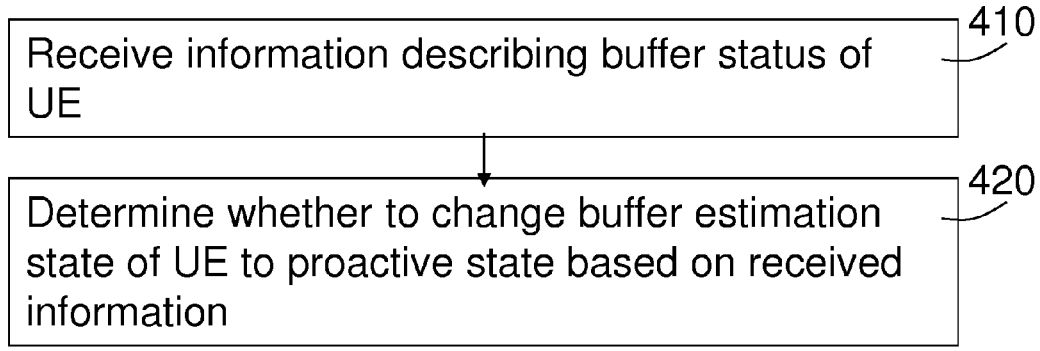
FIGS. 4a-4c are flowcharts of the method in the network node according to embodiments.

FIG. 4a is a flowchart of a method in a network node of a wireless communications system, for supporting a change of a buffer estimation state of a UE from a passive to a proactive state, according to embodiments. In one embodiment, the network node is a base station. According to one example, the network node may be the eNodeB in an E-UTRAN. The method comprises:

410: Receiving information describing a buffer status of the UE.

420: Determining whether to change the buffer estimation state of the UE to the proactive state based on the received information.

Figure 4B:
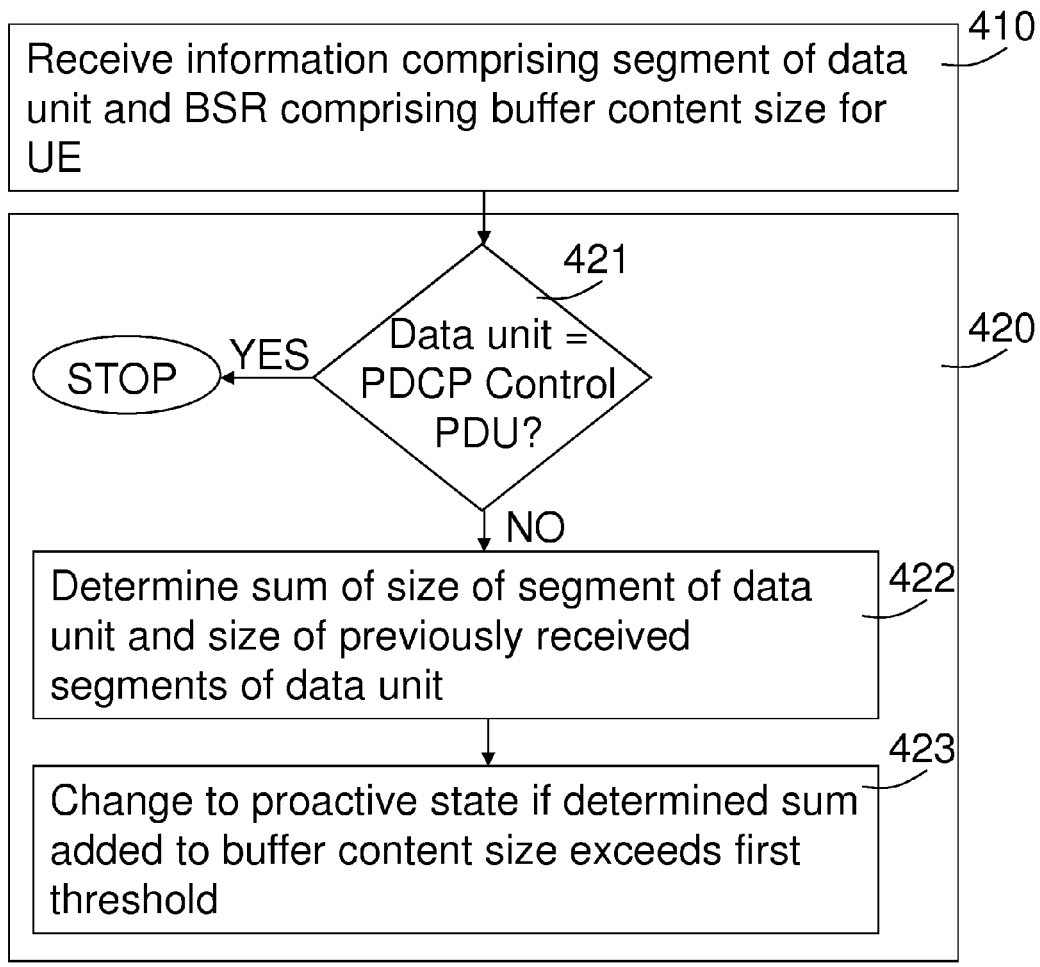

FIG. 4b is a flowchart of a method in the network node according to the first embodiment described above. In the first embodiment, the received information comprises a segment of a data unit and a buffer status report comprising a buffer content size for the UE. As the data unit is segmented, it may be difficult to determine if it is a SID frame or a speech frame that arrives. The step 420 of determining whether to change the buffer estimation state comprises:

422: Determining a sum of a size of the segment of the data unit and a size of previously received segments of the data unit. By adding the sizes of the different received segments, the eNodeB gets a better picture of the total size of the data unit, and may thus make a better decision of what state the UE is in. In one embodiment, a counter indicates the size of the previously received segments of the data unit. Determining 422 the sum comprises setting the counter to zero if the segment is the last segment of the data unit, and otherwise incrementing the counter with the size of the segment of the data unit.

423: Changing to the proactive state if the determined sum added to the buffer content size exceeds a first threshold. The first threshold is thus the size threshold described above. The sum of the segment sizes and the buffer content size indicated in the BSR should thus be compared with the size threshold. The value of the first threshold may be pre-determined. Alternatively the value of the first threshold may be determined based on observed traffic patterns. Furthermore, the value of the first threshold may be dependent on a type of codec used.

In one embodiment, the determining whether to change the buffer estimation state in step 420 also comprises the initial step 421 of determining whether the segment of the data unit is a Packet Data Control Protocol (PDCP) control PDU, and performing the consecutive steps of determining 422 the sum and changing 423 to the proactive state only if the segment of the data unit is determined not to be a PDCP control PDU. The PDCP Control PDU is used to convey among other things header compression control information, e.g. interspersed Robust Header Compression (ROHC) feedback, and should not trigger any state change.

Figure 4C:
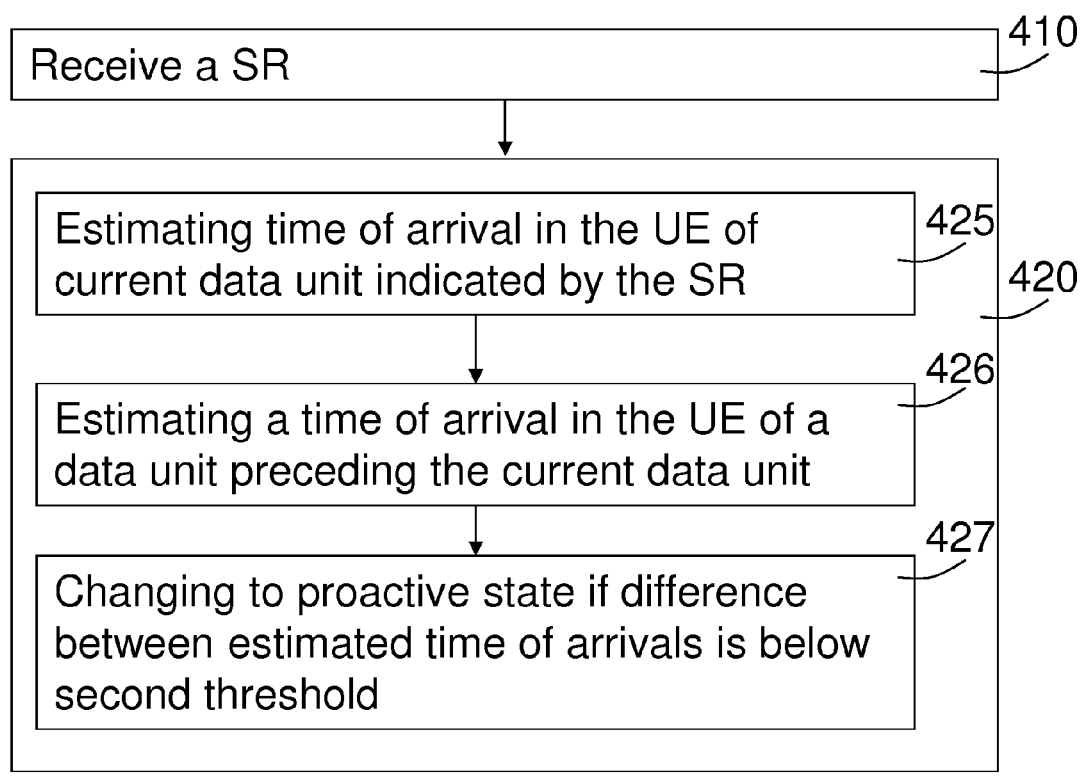

FIG. 4c is a flowchart of a method in the network node according to the second embodiment described above. In the second embodiment, the received information is a SR, and determining 420 whether to change the buffer estimation state comprises:

425: Estimating a time of arrival in the UE of a current data unit indicated by the SR. As explained above, the time of arrival is estimated to be the time when the SR was transmitted, which is known to the eNodeB.

426: Estimating a time of arrival in the UE of a data unit preceding the current data unit. The data unit preceding the current data unit most probably corresponded to a SID frame, and the arrival of that SID frame at the UE triggered an SR. The time of arrival is thus estimated to be the time when this previous SR was transmitted by the UE.

427: Changing to the proactive state if a difference between the estimated time of arrival of the current data unit and the estimated time of arrival of the data unit preceding the current data unit is below a second threshold. The second threshold corresponds to the time threshold described above.

In one embodiment, a value of the second threshold is smaller than a time interval between two consecutive SID frames. The interval between SID frames may be determined by counting a minimum time between estimated arrival times of SIDs when in passive state. Alternatively, the interval between SID frames may be determined by counting the median time between estimated arrival times of SIDs when in passive state. Furthermore, the value of the second threshold may be dependent on the type of codec used. As mentioned above, the time between SID frames vary for different types of codecs.

Figure 5A:
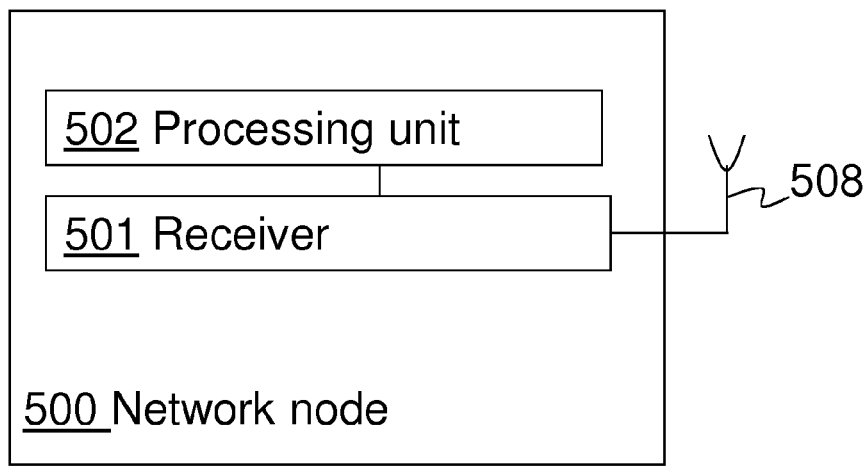
FIGS. 5a-5b are block diagrams illustrating the network node according to embodiments.

A network node 500 for a wireless communications system, configured to support a change of a buffer estimation state of a UE from a passive to a proactive state, is schematically illustrated in the block diagram in FIG. 5a according to embodiments. The network node is in one embodiment a BS, such as an eNodeB. The network node 500 comprises a receiver 501 configured to receive information describing a buffer status of the UE, and a processing unit 502 configured to determine whether to change the buffer estimation state of the UE to the proactive state based on the received information. In FIG. 5a, the receiver 501 is connected to an antenna 508 via an antenna port. However, there may be more than one antenna and/or antenna ports.

According to the first embodiment, the receiver 501 is configured to receive information comprising a segment of a data unit and a buffer status report comprising a buffer content size for the UE. The processing unit 502 is configured to determine whether to change the buffer estimation state by determining a sum of a size of the segment of the data unit and a size of previously received segments of the data unit, and changing to the proactive state if the determined sum added to the buffer content size exceeds a first threshold. The value of the first threshold may be pre-determined. Alternatively the value of the first threshold may be determined based on observed traffic patterns. Furthermore, the value of the first threshold may be dependent on a type of codec used. Furthermore, the processing unit 502 may be configured to determine whether to change the buffer estimation state by initially determining whether the segment of the data unit is a PDCP control PDU, and determining the sum and changing to the proactive state only if the segment of the data unit is determined not to be a PDCP control PDU.

In one embodiment, a counter indicates the size of the previously received segments of the data unit, and the processing unit 502 is configured to determine the sum by setting the counter to zero if the segment is the last segment of the data unit, and otherwise incrementing the counter with the size of the segment of the data unit.

According to the second embodiment, the receiver 501 is configured to receive a SR, and the processing unit 502 is configured to determine whether to change the buffer estimation state by estimating a time of arrival in the UE of a current data unit indicated by the SR, estimating a time of arrival in the UE of a data unit preceding the current data unit, and changing to the proactive state if a difference between the estimated time of arrival of the current data unit and the estimated time of arrival of the data unit preceding the current data unit is below a second threshold.

In one embodiment, a value of the second threshold is smaller than a time interval between two consecutive SID frames. The interval between SID frames may be determined by counting a minimum time between estimated arrival times of SIDs when in passive state. Alternatively, the interval between SID frames may be determined by counting the median time between estimated arrival times of SIDs when in passive state. Furthermore, the value of the second threshold may be dependent on the type of codec used.

The units described above with reference to FIG. 5a may be logical units, separate physical units or a mixture of both logical and physical units.

Figure 5B:
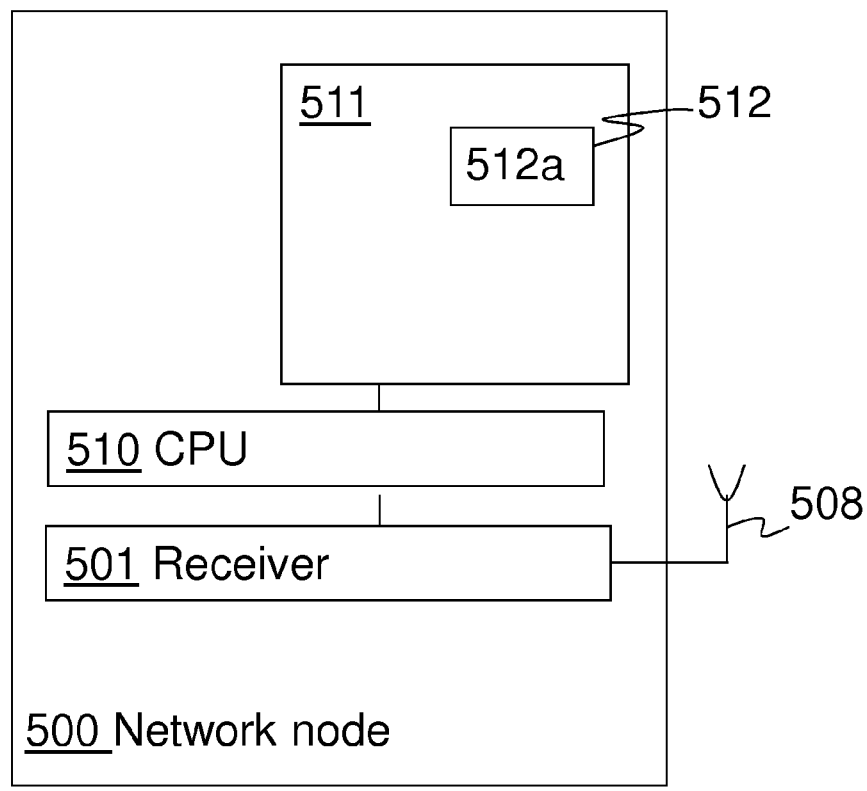

FIG. 5b schematically illustrates an embodiment of the network node 500, which is an alternative way of disclosing the embodiment illustrated in FIG. 5a. The network node 500 comprises a receiver 501 connected to an antenna 508 via an antenna port, as already described above with reference to FIG. 5a. The network node 500 also comprises a Central Processing Unit (CPU) 510 which may be a single unit or a plurality of units. Furthermore, the network node 500 comprises at least one computer program product 511 in the form of a non-volatile memory, e.g. an EEPROM (Electrically Erasable Programmable Read-Only Memory), a flash memory or a disk drive. The computer program product 511 comprises a computer program 512, which comprises code means which when run on the network node 500 causes the CPU 510 on the network node 500 to perform steps of the procedure described earlier in conjunction with FIG. 4a.

Hence in the embodiment described, the code means in the computer program 512 of the network node 500 comprises a module 512a for determining whether to change the buffer estimation state of the UE to the proactive state based on received information. The code means may thus be implemented as computer program code structured in computer program modules. The module 512a essentially performs the step 520 of the flow in FIG. 4a to emulate the network node described in FIG. 5a. In other words, when the module 512a is run on the CPU 510, it corresponds to the processing unit 502 of FIG. 5a.

Although the code means in the embodiment disclosed above in conjunction with FIG. 5b is implemented as a computer program module, it may in alternative embodiments be implemented at least partly as a hardware circuit.

The above mentioned and described embodiments are only given as examples and should not be limiting. Other solutions, uses, objectives, and functions within the scope of the accompanying patent claims may be possible.

The invention claimed is:

1. A method in a network node of a wireless communications system for supporting a change of a buffer estimation state of a user equipment from a passive to a proactive state, the method comprising:
   receiving information describing a buffer status of the user equipment, the received information comprising a segment of a data unit and a buffer status report comprising a buffer content size for the user equipment; and
   determining whether to change the buffer estimation state of the user equipment to the proactive state based on the received information, wherein said determining comprises:
      determining a sum of a size of the segment of the data unit and a size of previously received segments of the data unit, and
      changing to the proactive state if the determined sum added to the buffer content size exceeds a first threshold.

2. The method of claim 1, wherein determining whether to change the buffer estimation state comprises the initial step of determining whether the segment of the data unit is a Packet Data Control Protocol (PDCP) control protocol data unit, and performing the steps of determining the sum and changing to the proactive state only if the segment of the data unit is determined not to be a PDCP control protocol data unit.

3. The method of claim 1, wherein a counter indicates the size of the previously received segments of the data unit, and wherein determining the sum comprises:
   if the segment is the last segment of the data unit,
      setting the counter to zero;
   and otherwise,
      incrementing the counter with the size of the segment of the data unit.

4. The method of claim 1, wherein a value of the first threshold is pre-determined.

5. The method of claim 1, wherein a value of the first threshold is determined based on observed traffic patterns.

6. The method of claim 1, wherein the value of the first threshold is dependent on a type of codec used.

7. The method of claim 1, wherein the network node is a base station.

8. A method in a network node of a wireless communications system for supporting a change of a buffer estimation state of a user equipment from a passive to a proactive state, the method comprising:
   receiving information describing a buffer status of the user equipment, the received information comprising a scheduling request from the user equipment; and
   determining whether to change the buffer estimation state of the user equipment to the proactive state based on the received information, wherein said determining comprises:
      estimating a time of arrival in the user equipment of a current data unit indicated by the scheduling request;
      estimating a time of arrival in the user equipment of a data unit preceding the current data unit; and
      changing to the proactive state if a difference between the estimated time of arrival of the current data unit and the estimated time of arrival of the data unit preceding the current data unit is below a second threshold.

9. The method of claim 8, wherein a value of the second threshold is smaller than a time interval between two consecutive silence indicator frames.

10. The method of claim 8, wherein the value of the second threshold is dependent on the type of codec used.

11. A network node for a wireless communications system, configured to support a change of a buffer estimation state of a user equipment from a passive to a proactive state, the network node comprising:
   a receiver configured to receive information describing a buffer status of the user equipment, the information comprising a segment of a data unit and a buffer status report comprising a buffer content size for the user equipment; and
   a processing unit configured to determine whether to change the buffer estimation state of the user equipment to the proactive state based on the received information, by determining a sum of a size of the segment of the data unit and a size of previously received segments of the data unit, and changing to the proactive state if the determined sum added to the buffer content size exceeds a first threshold.

12. The network node of claim 11, wherein the processing unit is configured to determine whether to change the buffer estimation state by initially determining whether the segment of the data unit is a Packet Data Control Protocol (PDCP) control protocol data unit, and determining the sum and changing to the proactive state only if the segment of the data unit is determined not to be a PDCP control protocol data unit.

13. The network node of claim 11, wherein a counter indicates the size of the previously received segments of the data unit, and wherein the processing unit is configured to determine the sum by setting the counter to zero if the segment is the last segment of the data unit, and otherwise incrementing the counter with the size of the segment of the data unit.

14. The network node of claim 11, wherein a value of the first threshold is pre-determined.

15. The network node of claim 11, wherein a value of the first threshold is determined based on observed traffic patterns.

16. The network node of claim 11, wherein the value of the first threshold is dependent on a type of codec used.

17. The network node of claim 11, wherein the network node is a base station.

18. A network node for a wireless communications system, configured to support a change of a buffer estimation state of a user equipment from a passive to a proactive state, the network node comprising:

a receiver configured to receive information describing a buffer status of the user equipment, the information comprising a scheduling request;

a processing unit configured to determine whether to change the buffer estimation state to the proactive state based on the received information, by estimating a time of arrival in the user equipment of a current data unit indicated by the scheduling request, estimating a time of arrival in the user equipment of a data unit preceding the current data unit, and changing to the proactive state if a difference between the estimated time of arrival of the current data unit and the estimated time of arrival of the data unit preceding the current data unit is below a second threshold.

19. The network node of claim 18, wherein a value of the second threshold is smaller than a time interval between two consecutive silence indicator frames.

20. The network node of claim 18, wherein the value of the second threshold is dependent on the type of codec used.

* * * * *